United States Patent
Kalra

(10) Patent No.: US 11,243,952 B2
(45) Date of Patent: Feb. 8, 2022

(54) DATA CACHE USING DATABASE TRIGGER AND PROGRAMMATICALLY RESETTING SEQUENCE

(71) Applicant: BANK OF AMERICA CORPORATION, Charlotte, NC (US)

(72) Inventor: Paramdeep Singh Kalra, Dublin, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 453 days.

(21) Appl. No.: 15/985,814

(22) Filed: May 22, 2018

(65) Prior Publication Data

US 2019/0361984 A1 Nov. 28, 2019

(51) Int. Cl.
*G06F 16/2455* (2019.01)
*G06F 16/22* (2019.01)

(52) U.S. Cl.
CPC .... *G06F 16/24552* (2019.01); *G06F 16/2282* (2019.01)

(58) Field of Classification Search
None
See application file for complete search history.

(56) References Cited

U.S. PATENT DOCUMENTS

| 4,195,340 A | 3/1980 | Joyce |
| 5,491,811 A | 2/1996 | Arimilli et al. |
| 5,542,062 A | 7/1996 | Taylor et al. |
| 5,727,203 A | 3/1998 | Hapner et al. |
| 5,774,685 A | 6/1998 | Dubey |
| 5,892,937 A | 4/1999 | Caccavale |
| 5,940,827 A | 8/1999 | Hapner et al. |
| 6,047,363 A | 4/2000 | Lewchuk |
| 6,119,203 A | 9/2000 | Snyder et al. |
| 6,327,644 B1 | 12/2001 | Beardsley et al. |
| 6,449,695 B1 | 9/2002 | Bereznyi et al. |
| 6,453,404 B1 | 9/2002 | Bereznyi et al. |
| 6,487,641 B1 | 11/2002 | Cusson et al. |
| 6,557,076 B1 | 4/2003 | Copeland et al. |
| 6,574,709 B1 | 6/2003 | Skazinski et al. |
| 6,732,084 B1 | 5/2004 | Kabra et al. |
| 7,181,017 B1 * | 2/2007 | Nagel ................ H04L 9/0825 380/282 |

(Continued)

*Primary Examiner* — Ashish Thomas
*Assistant Examiner* — Mellissa M. Ohba
(74) *Attorney, Agent, or Firm* — Moore & Van Allen PLLC; James C. Edwards

(57) ABSTRACT

Expedition of retrieval of data from a database and loading of the retrieved data in an associated application. A cache table within the database is provided that associates a session identifier (i.e., a data record identifier) with a sequence identifier. As data records are received into the database, a sequencer is triggered that generates a sequence identifier for the data record and an entry is created in the cache table that associates the sequence identifier with the session identifier. Data is retrieved from the database and populated within the application, by (i) accessing the sequencer within the database to determine the last-in-time sequence identifier, (ii) accessing the cache table to determine a range of cache table entries based on the last-in-time sequence identifier, and (iii) retrieving the data records in the applicable data tables based on the associated session identifiers in the cache table entries.

14 Claims, 7 Drawing Sheets

(56) References Cited

U.S. PATENT DOCUMENTS

| | | |
|---|---|---|
| 7,409,379 B1 | 8/2008 | Katzer |
| 7,953,744 B2 | 5/2011 | Gharat et al. |
| 9,432,269 B2 * | 8/2016 | Annamalaisami ...... H04L 43/04 |
| 9,438,488 B2 * | 9/2016 | Joshi .................... H04L 43/026 |
| 2002/0116582 A1 | 8/2002 | Copeland et al. |
| 2003/0145314 A1 | 7/2003 | Nguyen et al. |
| 2009/0157980 A1 | 6/2009 | Bruce |
| 2012/0117509 A1 * | 5/2012 | Powell .............. G06F 16/24575 715/786 |
| 2018/0074917 A1 * | 3/2018 | Choudhary ......... G06F 11/1446 |
| 2018/0089258 A1 * | 3/2018 | Bhattacharjee ... G06F 16/24535 |
| 2018/0089259 A1 * | 3/2018 | James ................. G06F 16/2425 |
| 2018/0089262 A1 * | 3/2018 | Bhattacharjee ... G06F 16/24535 |
| 2018/0089269 A1 * | 3/2018 | Pal .................... G06F 16/24554 |
| 2018/0089278 A1 * | 3/2018 | Bhattacharjee ....... G06F 16/278 |

\* cited by examiner

DATA CACHE USING DATABASE TRIGGER AND PROGRAMMATICALLY RESETTING SEQUENCE

FIELD

In general, embodiments of the invention relate to computing databases, and more specifically, expediting an application's retrieval of data from a database and subsequent loading via use of cache table that associates a data generating session identifier with a sequence identifier for the purpose of readily identifying data in the database associated with applicable data sessions.

BACKGROUND

In certain data-capturing applications, data is captured and once the user's data session has ended the captured data is transmitted and persisted in a database, such as an application with an embedded database. When the user subsequently re-launches the application, the application may be configured to present a landing/home page which displays a predetermined number of data records retrieved from the database. For example, the landing/home page may display thirty (30) data records corresponding to the user's previous (last-in-time) thirty (30) data sessions. As the user navigates to the next page of the application, an additional predetermined number of data records are retrieved from the database and displayed on the next page. Likewise as the user navigates back to the landing/home page or any previously displayed page, data records are once again retrieved from the database and displayed on the previously displayed page.

As databases grow in size, the time required to retrieved data from the databases and load the data within the applications tends to increase. Various methods have been implemented to expedite the data retrieval and loading process. For example, data may be pre-fetched during the application launch or while the user is logging-in and/or results of data retrieval queries (e.g., navigating to next page) may be stored in an application cache, so that the data may be re-displayed quickly in the event that the user resubmits that query (i.e., navigates back to the same page within the application). However, in many instances such existing methods may have limitations which are unfavorable and/or prohibitive to the application and/or user.

Therefore a need exists to develop new methods for expediting an application's retrieval of data from a database, such as an embedded database and the subsequent loading of the data within the application. The desired methodology should be especially suited to applications which retrieve and display data in chronological order, such as Last-In First-Out (LIFO) data retrieval which displays data associated with the most recent data record/session first. In addition, the desired methodology should be suitable for use with applications that retrieve and display a predetermined number of data records at a given instance, for example an application that retrieves and displays a specific number of data records per page triggered by user navigation within the application. The desired methodology should implemented so as to retrieve and display data within the application with minimal latency.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, computer program products, and the like for expediting the retrieval of data from a database and loading of the retrieved data in an associated application. The invention implements a cache table within the database that associates a session identifier (i.e., a data record identifier) with a sequence identifier. In this regard, as data records are received into the database, a sequencer is triggered to generate a sequence identifier for the data record and an entry is created in the cache table that associates the sequence identifier with the session identifier.

When the application requests the database to retrieve a predetermined number of data records (e.g., the last-in-time×number of data records), the application accesses the sequencer within the database to determine the last-in-time sequence identifier, in response, accesses the cache table to determine a range of entries beginning with the last-in-time sequence identifier and ending with the (last-in-time sequence identifier-predetermined number of data records). In response to identifying the session identifiers associated with the range of entries in the cache table, the database retrieves the data in the applicable data tables, transmits the data to the application, which, in turn, populates the applicable displayed page or the like with the data. Such a methodology insures that data is retrieved and displayed within the application in an efficient and timely fashion.

Moreover, in the event that the cache table needs to be re-populated (e.g., in the event the database crashes or the like), the cache table can be automatically re-populated in conjunction with bringing the database back up. In this regard, the database can be queried for data session identifiers and timestamps and the cache table re-populated with entries that associate the data identifiers with sequence identifiers that are generated in order based on the timestamps of the data records in the database.

A system for managing data retrieval defines first embodiments of the invention. The system includes an application that is stored in a first memory and executable by one or more first processors. The application is configured to receive inputs of data during a user session, and transmit, to a database, a data transmission including (i) a data record including the data, and (ii) a session identifier. The system additionally includes the database that is stored in a second memory and executable by at least one second processor. The database includes one or more data tables configured to persist data from the data record. In addition, the database includes a sequencer configured to be triggered by receipt of the data transmission to generate a next sequence identifier for the data record and a cache table configured to receive the next sequence identifier and create an entry in the cache table that associate the next sequence identifier with the session identifier for the data record.

In specific embodiments of the system, the application is further configured to retrieve a predetermined number (n) of last-in-time data records from the database. Specifically, retrieval occurs by, in response to receiving an initial call to display the predetermined number (n) of data records, querying the sequencer to determine the sequence identifier (x) of a last-in-time entry in the cache table and requesting the database to retrieve, from the data tables, the predetermined number (n) of data records based on the sequence identifier (x). Once the predetermined number (n) of data records have been retrieved, the data records are communicated to the application and populated within a page of the application. In specific embodiments of the system, the application is configured to query the sequencer to determine a yet-to-be-assigned next sequence identifier (y) and subtract, from the yet-to assigned next sequence identifier (y), a sequence value to determine the last-in-time entry in the cache table. For example, if the sequence value is one (1), the application will subtract a value of one (1) from the yet-to-be-assigned next sequence identifier (y) to determine the sequence identifier of the last-in-time entry in the cache table.

In other specific embodiments of the system, the application is further configured to request the database to retrieve, from the data tables, the predetermined number (n) of data records by determining a range of sequence identifiers defining the predetermined number (n) of data records based on the sequence identifier (x), requesting the cache table to retrieve session identifiers associated with the range of sequence identifiers, and requesting the database to retrieve, from the data tables, the predetermined number (n) of data records corresponding to the retrieved session identifiers. In such embodiments of the system, the range may be configured to begin with the sequence identifier (x) and end with a sequence identifier (z) defined as (x-n).

In further such embodiments of the invention, the application may configured to receive an additional predetermined number ($n_1$) of data records from the database. The additional predetermined number ($n_1$) may the same predetermined number (n) or a different number and the retrieval of which may be triggered by a user of the application navigating to (i.e., requesting display of) a different page within the application. In this regard, requesting the additional predetermined number ($n_1$) of data records from the database may ensue in response to receiving a subsequent call to display the additional predetermined number ($n_1$) of data records. As a result, the application may be configured to request the database to retrieve, from the data tables, the additional predetermined number ($n_1$) of data records based on the sequence identifier (z), and receive from the database and populating within another page of the application the additional predetermined number ($n_1$) of data records. In such embodiments of the system the application may be further configured to request the database to retrieve, from the data tables, the additional predetermined number ($n_1$) of data records by determining a second range of sequence identifiers defining the additional predetermined number ($n_1$) of data records based on the sequence identifier (z), requesting the cache table to retrieve session identifiers associated with the second range of sequence identifiers, and requesting the database to retrieve, from the data tables, the additional predetermined number ($n_1$) of data records corresponding to the retrieved session identifiers.

In further specific embodiments of the invention, the database is configured to, upon detection of an event (i.e., database crash or the like) that requires re-population of the cache table, query the database to determine session identifiers of data records and a corresponding timestamp associated with receipt a data record into the database and re-populate the cache table with entries corresponding to each of the data records based on the session identifiers and the corresponding timestamps. In such embodiments of the invention database is configured to re-populate the cache table with entries corresponding to each of the data records by assigning the data record with an earliest timestamp a first sequence identifier (e.g., in those, embodiments of the invention in which the sequence value is one (1), the first sequence identifier is one (1)).

A computer-implemented method for managing data retrieval defines second embodiments of the invention. The method is executed by a computing device processor. The method includes, in response to receiving, at an application, inputs of data during a user session, transmitting, to a database, a data transmission including (i) a data record including the data, and (ii) a session identifier associated with the user session. The method further includes, in response to receiving, at the database, the data transmission, triggering generation of a next sequence identifier for the data record and creating an entry within a cache table that associates the next sequence identifier with the session identifier for the data record, The method further includes persisting the data from the data record in one or more data tables within the database.

In specific embodiment the method further includes, in response to the application receiving an initial call to display a predetermined number (n) of data records, querying the database to determine the sequence identifier (x) of a last-in-time entry in the cache table, requesting, by the application, retrieval, from the data tables, of the predetermined number (n) of data records based on the sequence identifier (x) and receiving, at the application, the predetermined number (n) of data records and populating one or more pages of the application with data. In such embodiments of the invention, querying the database to determine the sequence identifier (x) further includes querying the database to determine a yet-to-be-assigned next sequence identifier (y); and calculating the sequence identifier (x) by subtracting a sequence value (e.g., one (1)) from the yet-to assigned next sequence identifier (y). In other such embodiments of the method, requesting retrieval of the predetermined number (n) of data records further includes determining a range of sequence identifiers defining the predetermined number (n) of data records based on the sequence identifier (x), retrieving from the cache table session identifiers associated with the range of sequence identifiers, and retrieving, from the data tables, the predetermined number (n) of data records corresponding to the retrieved session identifiers. In such embodiments of the method, the range of sequence identifiers may be configured to begin with the sequence identifier (x) and end with a sequence identifier (z) defined as (x-n).

In other embodiments of the method an additional predetermined number ($n_1$) of data records may be retrieved from the database. The additional predetermined number ($n_1$) may the same predetermined number (n) or a different number and the retrieval of which may be triggered by a user of the application navigating to (i.e., requesting display of) a different page within the application. In such embodiments the method includes, in response to the application receiving a subsequent call to display additional predetermined number ($n_1$) of data records, requesting retrieval, from the data tables, of the additional predetermined number ($n_1$) of data records based on the sequence identifier (z), and receiving from the database and populating within another page of the application the additional predetermined number ($n_1$) of data records. In such embodiments of the method, requesting retrieval of the additional predetermined number ($n_1$) of data records further includes determining a second range of sequence identifiers defining the additional predetermined number ($n_1$) of data records based on the sequence identifier (z), requesting the cache table to retrieve session identifiers associated with the second range of sequence identifiers, and requesting retrieval, from the data tables, of the additional predetermined number ($n_1$) of data records corresponding to the retrieved session identifiers.

In additional specific embodiments the method includes, upon detecting an event (e.g., database crashing or the like) that requires re-population of the cache table, querying the database to determine session identifiers of data records and a corresponding timestamp associated with receipt a data record into the database, and re-populating the cache table with entries corresponding to each of the data records based on the session identifiers and the corresponding timestamps.

A computer program product including a non-transitory computer-readable medium defines third embodiments of the invention. The computer-readable medium includes a first set of codes for causing a computer to, in response to receiving, at an application, inputs of data during a user session, transmit, to a database, a data transmission including (i) a data record including the data, and (ii) a session identifier associated with the user session. The computer-readable medium additionally includes a second set of codes for causing a computer to, in response to receiving, at the database, the data transmission, trigger generation of a next sequence identifier for the data record. Additionally, the computer-readable medium includes a third set of codes for causing a computer to create an entry within a cache table that associates the next sequence identifier with the session identifier for the data record. Moreover, the computer-readable medium includes a fourth set of codes for causing a computer to persist the data from the data record in one or more data tables within the database.

In additional embodiments of the computer program product the computer-readable medium includes a fifth set of codes for causing a computer to, in response to the application receiving an initial call to display a predetermined number (n) of data records, query the database to determine the sequence identifier (x) of a last-in-time entry in the cache table and a sixth set of codes for causing a computer to request, by the application, retrieval, from the data tables, of the predetermined number (n) of data records based on the sequence identifier (x). In addition, the computer-readable medium includes a seventh set of codes for causing the computer to receive, at the application, the predetermined number (n) of data records, and an eighth set of codes for causing a computer to populate, at the application, one or more pages of the application with data from the predetermined number (n) of data records.

In other specific embodiments of the computer program product the computer-readable medium includes a fifth set of codes for causing a computer to, upon detecting an event that requires re-population of the cache table, query the database to determine session identifiers of data records and a corresponding timestamp associated with receipt a data record into the database; and a sixth set of codes for causing a computer to re-populate the cache table with entries corresponding to each of the data records based on the session identifiers and the corresponding timestamps.

Thus, embodiments of the invention will be described in greater detail below, which provide for expediting the retrieval of data from a database and loading of the retrieved data in an associated application. Specifically, the invention is applicable to expediting retrieving data in chronological order, such as Last-In First-Out (LIFO) or the like. In this regard, the invention implements a cache table within the database that associates a session identifier (i.e., a data record identifier) with a sequence identifier. In this regard, as data records are received into the database, a sequencer is triggered to generate a sequence identifier for the data record and an entry is created in the cache table that associates the sequence identifier with the session identifier. Data is retrieved from the database and populated within the application, by (i) accessing the sequencer within the database to determine the last-in-time sequence identifier, (ii) accessing the cache table to determine a range of entries beginning with the last-in-time sequence identifier and ending with the (last-in-time sequence identifier-predetermined number of data records), and (iii) retrieving the data records in the applicable data tables based on the associated session identifiers in the cache table entries.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
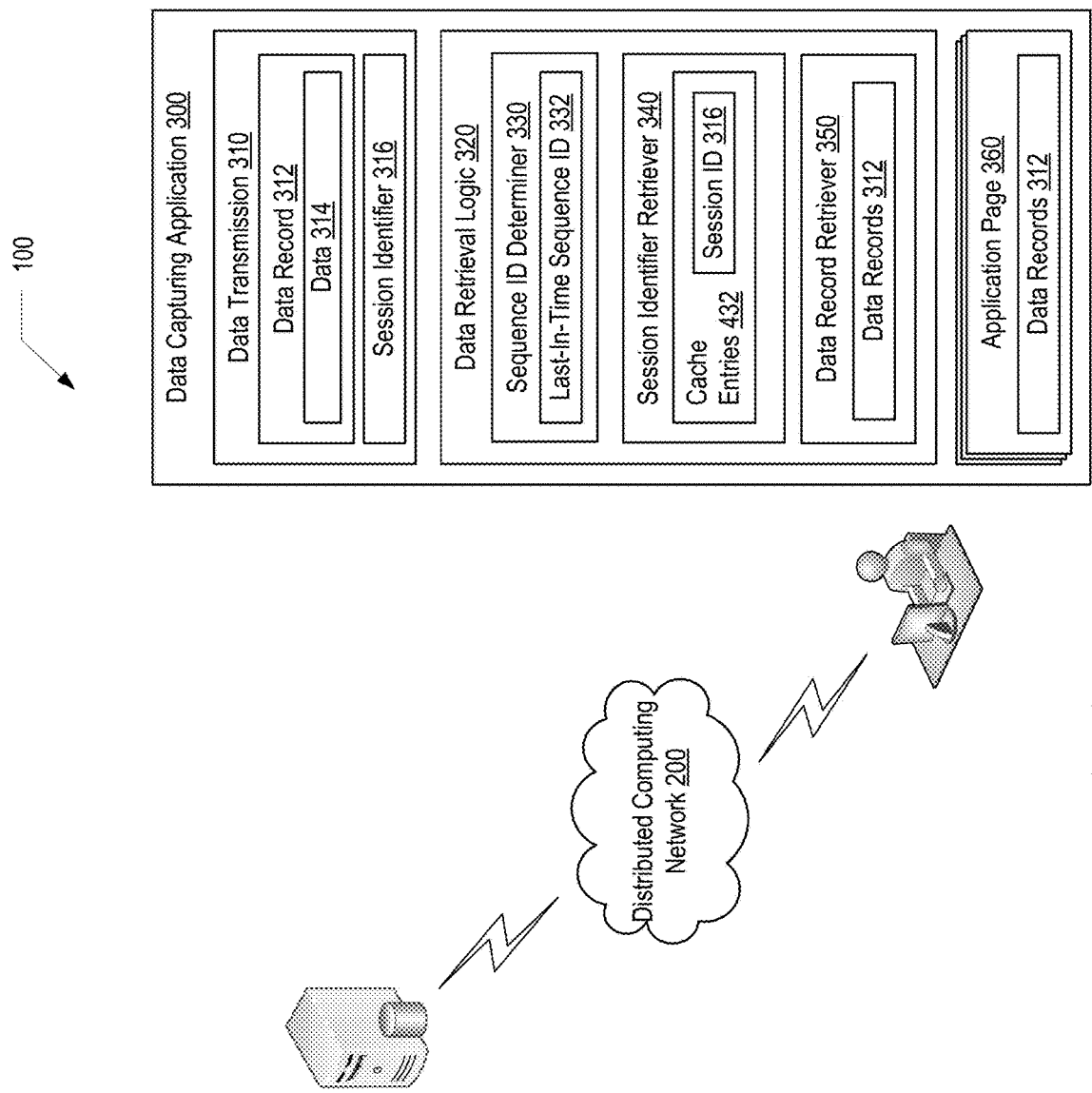
Figure 2:
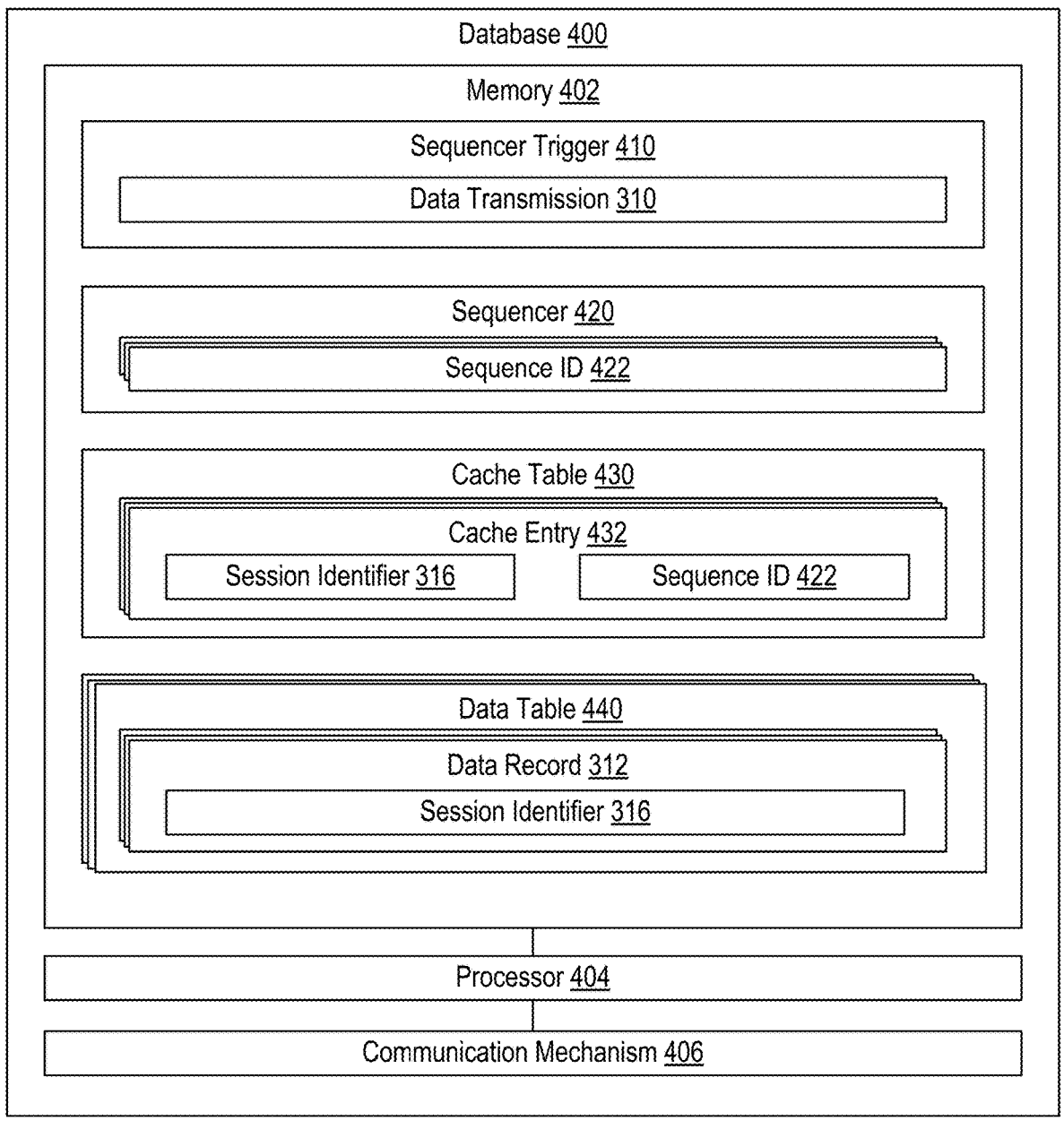
Figure 3:
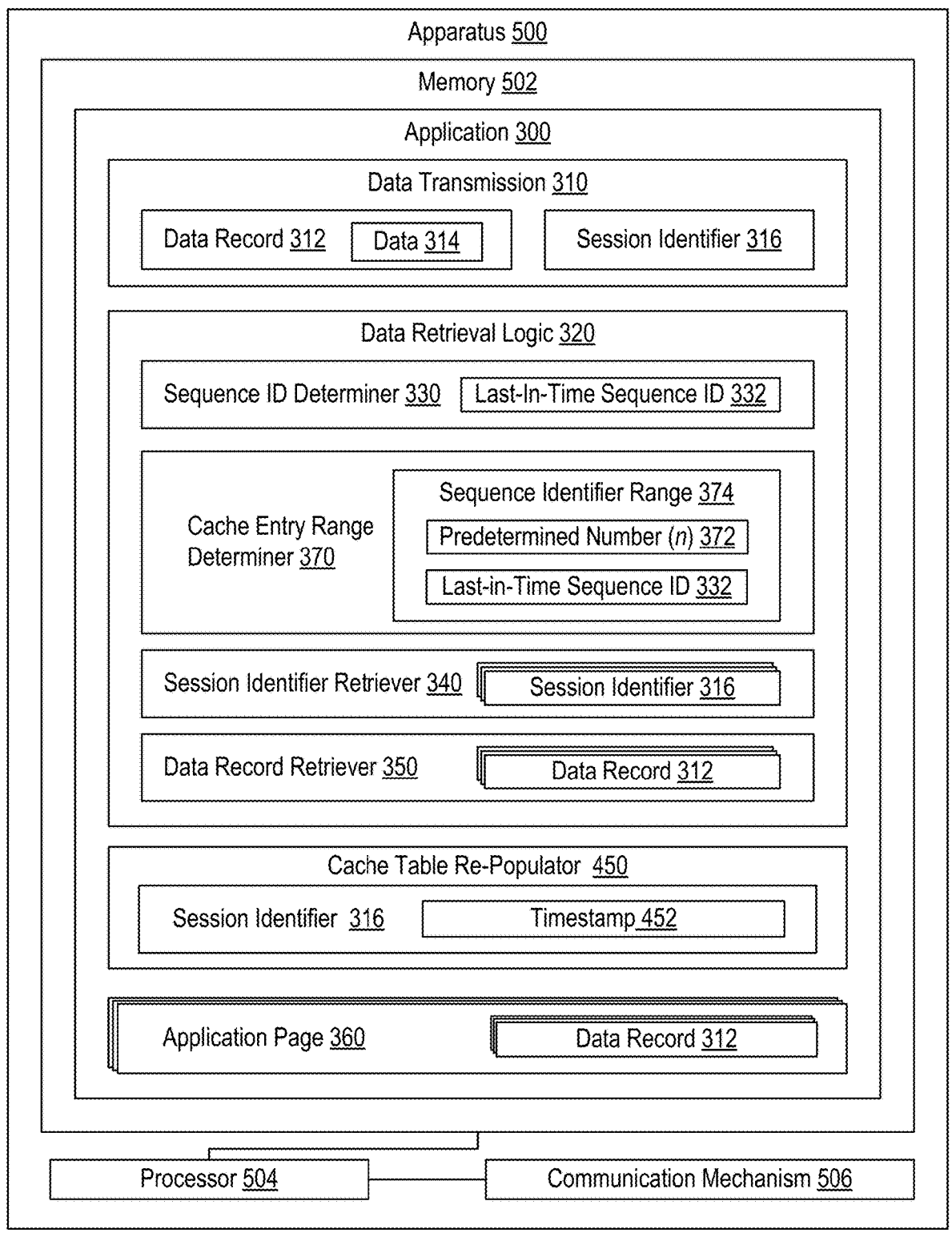
Figure 4:
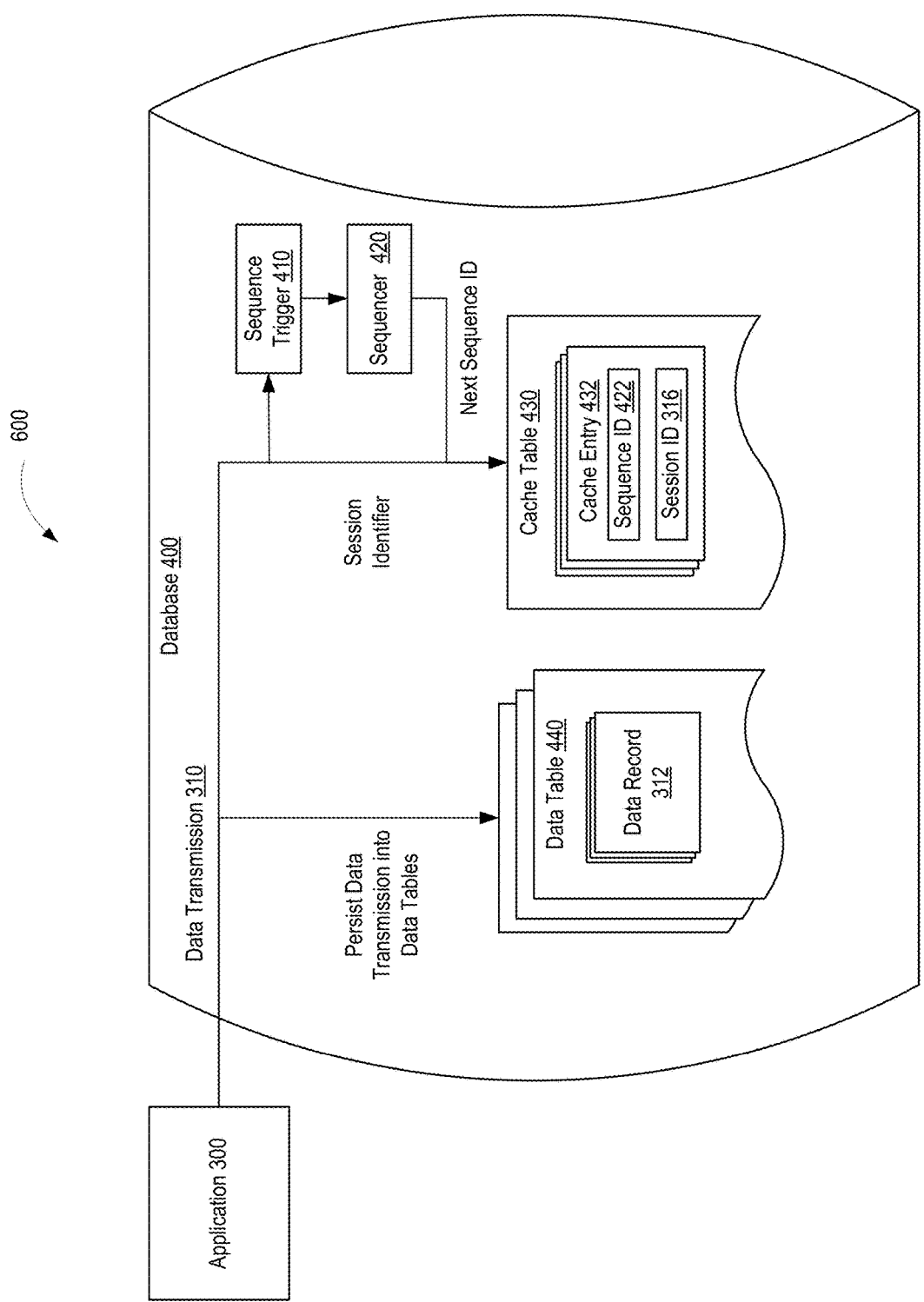
Figure 5:
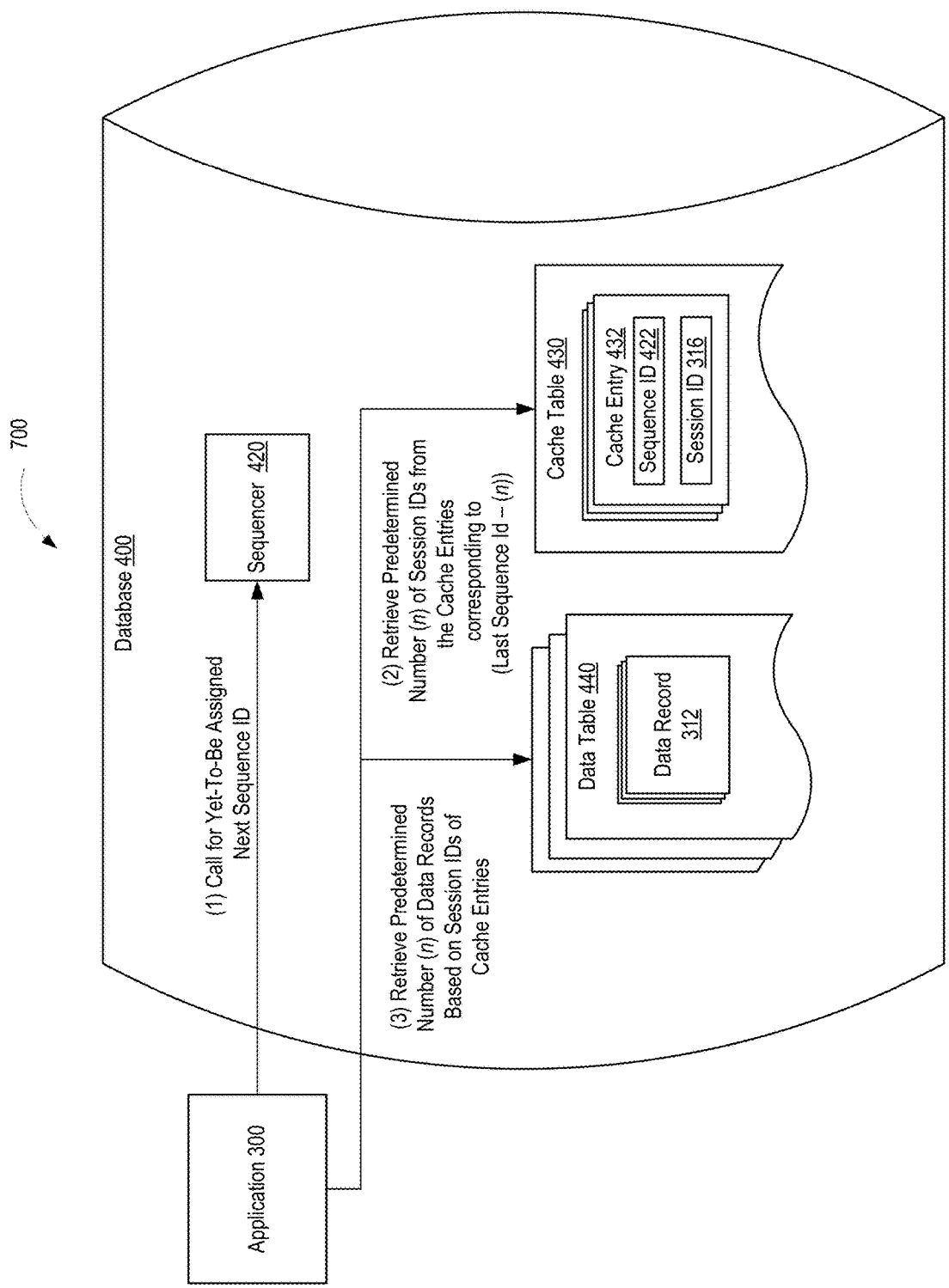
Figure 6:
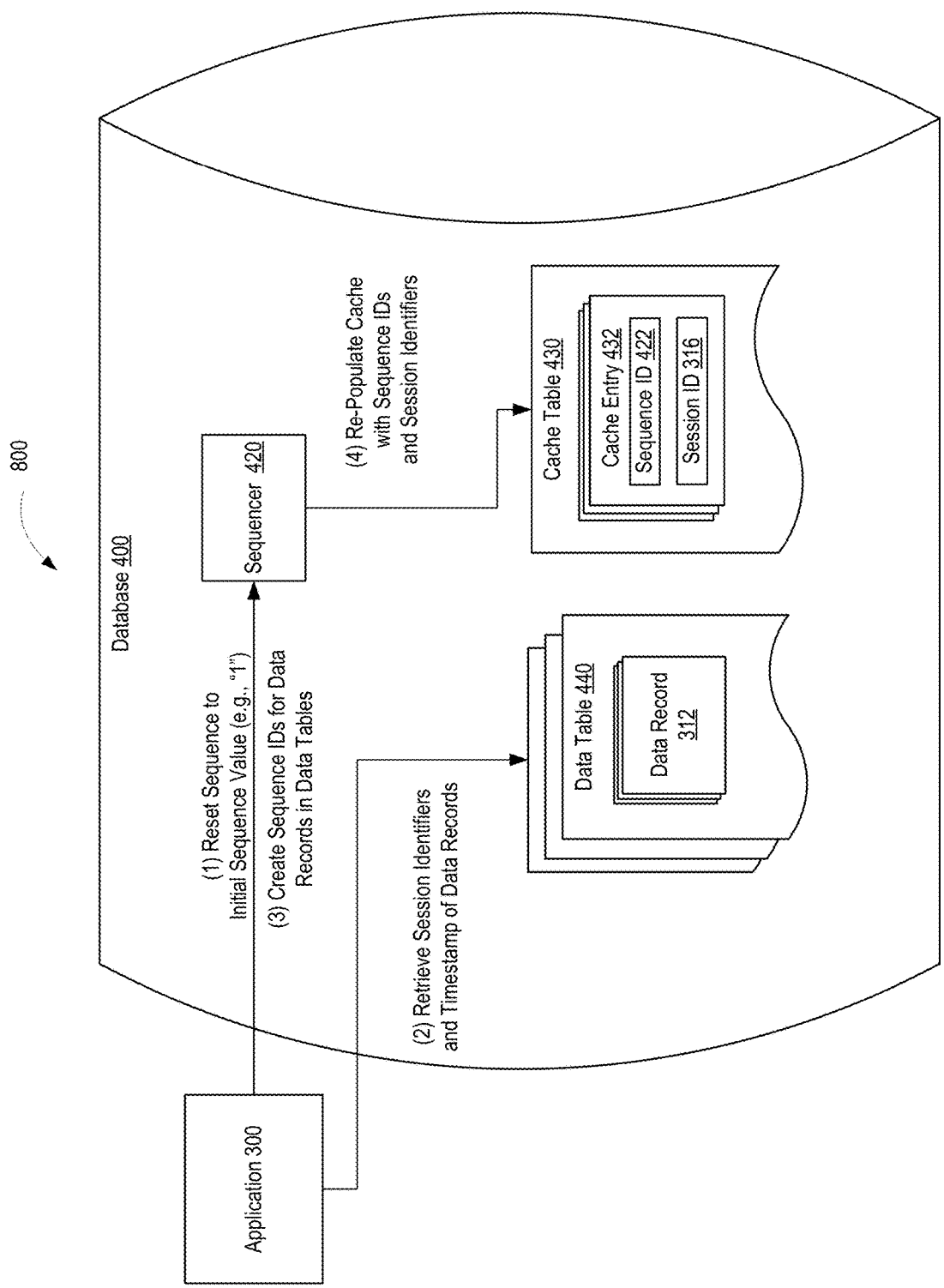
Figure 7:
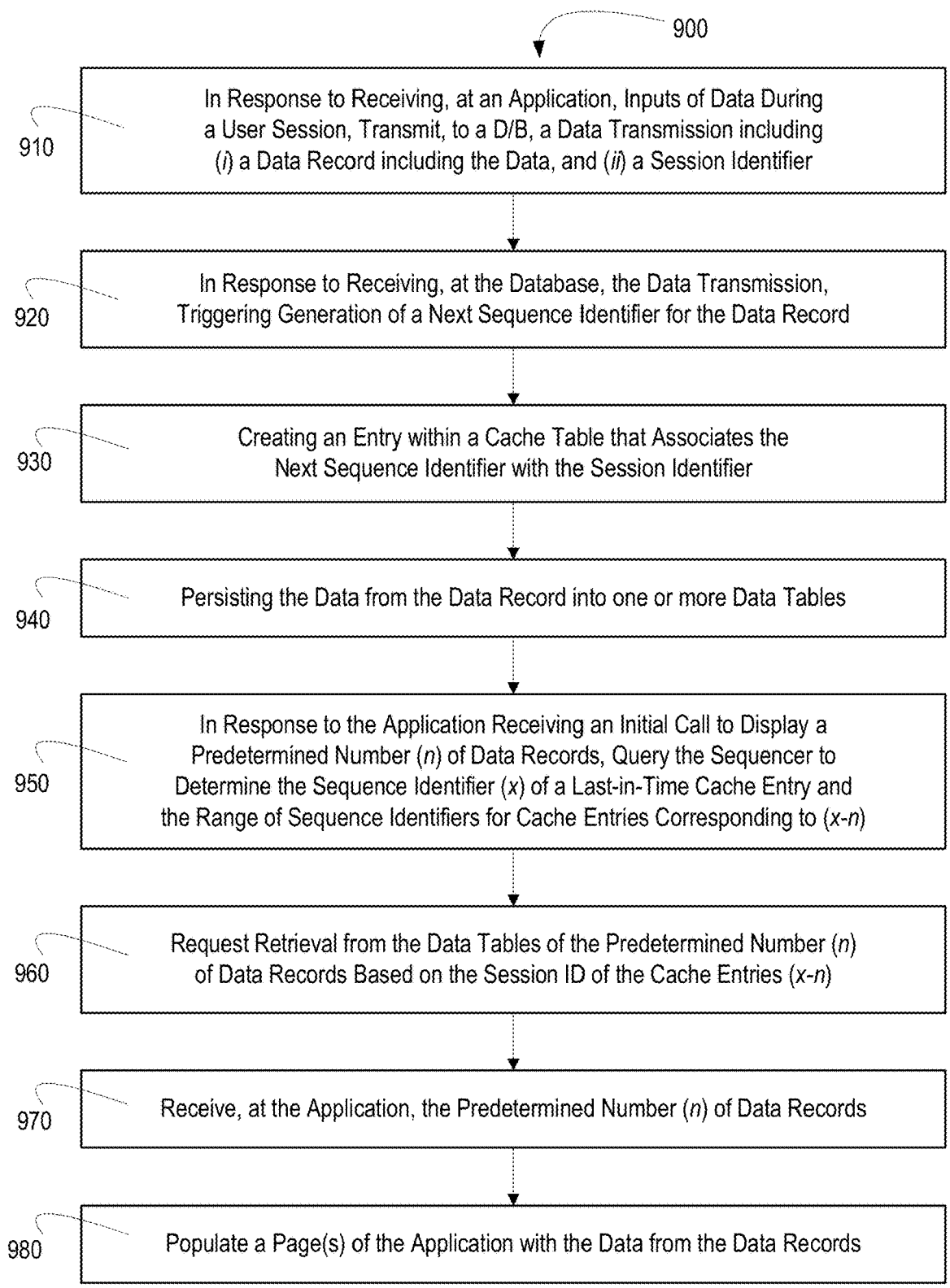

Having thus described embodiments of the invention in general terms, reference will now be made to the accompanying drawings, which are not necessarily drawn to scale, and wherein:

FIG. 1 provides a schematic diagram of an exemplary system for managing the retrieval of data from a database, in accordance with embodiments of the present invention;

FIG. 2 provides a block diagram on a database configured for expedited data retrieval, in accordance with embodiments of the present invention;

FIG. 3 provides a flow diagram of an apparatus executing an application configured for expedited data retrieval from an associated database, in accordance with embodiments of the present invention;

FIG. 4 provides a schematic/flow diagram illustrating a method for data persistence, in accordance with embodiments of the invention;

FIG. 5 provides a schematic/flow diagram illustrating a method for data retrieval, in accordance with embodiments of the invention;

FIG. 6 provides a schematic/flow diagram illustrating a method for re-populating a cache table, in accordance with embodiments of the invention; and FIG. 7 provides a flow diagram of a method for data persistence and retrieval, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for expediting the retrieval of data from a database and loading of the retrieved data in an associated application. The invention implements a cache table within the database that associates a session identifier (i.e., a data record identifier) with a sequence identifier. In this regard, as data records are received into the database, a sequencer is triggered to generate a sequence identifier for the data record and an entry is created in the cache table that associates the sequence identifier with the session identifier.

When the application requests the database to retrieve a predetermined number of data records (e.g., the last-in-time×number of data records), the application accesses the sequencer within the database to determine the last-in-time sequence identifier, in response, accesses the cache table to determine a range of entries beginning with the last-in-time sequence identifier and ending with the (last-in-time sequence identifier-predetermined number of data records). In response to identifying the session identifiers associated with the range of entries in the cache table, the database retrieves the data in the applicable data tables, transmits the data to the application, which, in turn, populates the applicable displayed page or the like with the data. Such a methodology insures that data is retrieved and displayed within the application in an efficient and timely fashion.

Moreover, in the event that the cache table needs to be re-populated (e.g., in the event the database crashes or the like), the cache table can be automatically re-populated in conjunction with bringing the database back up. In this regard, the database can be queried for data session identifiers and timestamps and the cache table re-populated with entries that associate the data identifiers with sequence identifiers that are generated in order based on the timestamps of the data records in the database.

Referring to FIG. 1, a schematic diagram is provided of an exemplary system 100 for managing a database, specifically the retrieval of data from a database, in accordance with embodiments of the invention. The system integrates a distributed computing network 200, such as an intranet and/or the Internet, which facilitates communication between a user apparatus executing an application 300 and an associated database 400. The application 300 is configured to receive user inputs of data 314 during a user session and, subsequently, transmit a data transmission 310 (i.e., data file) to the associated database 400, which may in certain embodiments be an embedded database. The data transmission 400 includes a data record 312 comprising the data 314, and a session identifier 316, which is a unique numeric or alphanumeric identifier generated for the user session.

The database 400 is configured to implement a sequence trigger 410 which is configured to trigger the sequencer 420 in response to an event. In embodiments of the present invention the event is receipt of the data transmission 310. In response to receiving a signal from the sequence trigger 410, the sequencer is configured to generate a sequence identifier, which is a unique numeric identifier associated with the data record 312 in the data transmission 310. In specific embodiments of the invention, the sequencer, which may comprise one or more sequencing schemas/algorithms, is configured to create sequence identifiers in sequential order based on a sequence pattern. In specific embodiments of the invention, the sequence pattern is an increment of one (1) and, thus, the initial sequence identifier is one (1) and each subsequent sequence identifier is incremented by a value of one (1) (i.e., 2, 3, 4 and so on). As the data record 312 and associated session identifier 316 are being persisted into one or more data tables 440 within the database 440, a cache entry 432 is created in a cache table 430 that associates the sequence identifier 422 with the session identifier 316. As is known by those of ordinary skill in the art, cache tables 430 are configured for more efficient access by a CPU than other data tables 440 within the database and, thus aid in the process of expediting subsequent retrieval of data from the database.

Application 300 is further configured to display data records 312 from previous user sessions. The data records 312 retrieved from the database 400 and displayed may be data records created solely by the user or by a plurality of users. In specific embodiments of the invention, the application 300 is configured to retrieve and display a predetermined number (i.e., a "batch") of data records 312 within a single user interface (i.e., an application page 360). For example, the application 300 may be configured to retrieve and display data records 312 within a given application page 360. In addition, according to embodiments of the invention herein disclosed, the application may be configured such that the data records 312 are displayed in chronological order. For example, the application 300 may be configured to display, in sequential order, the most recent data records 312 (i.e., the most recent data record 312 is displayed first, followed by the second-most recent data record 312 and so on), or the application 300 may be configured to display, in sequential order, the oldest data record 312 (i.e., the oldest data record 312 is displayed first, followed by the second-oldest data record 312 and so on).

In response to receiving an initial call for retrieval and display of a predetermined number (n) of data records 312 (i.e., the initial "batch" of data records 312), the data retrieval logic 320 of the application 300 is configured to invoke sequence ID determiner 330, which is configured to query the sequencer 420 within the database 400 to determine the last-in-time sequence identifier 332 (i.e., the most recently generated sequence identifier). In specific embodiments of the invention, the initial call may be automatically made in response to the user launching the application or the user logging into the application. In response to determining the last-in-time sequence identifier 332, the data retrieval logic 320 invokes the session identifier retriever 340 that is configured to retrieve the predetermined number (n) of cache entries from the cache table 430 of the database 400 based, at least, on the last-in-time sequence identifier 332 and identify the session identifier 316 of each of the cache entries 432. In response to identifying the session identifiers 316, the data retrieval logic 320 invokes the rata record retriever 350, which is configured to access the data tables 440 to efficiently identify and retrieve the data records 312 corresponding to the session identifiers 316. In response to retrieving the data records 312, the application 300 is configured to populate the application page 360 with the data 312 from the retrieved data records 312.

Referring to FIG. 2 a block diagram is presented of a database 400 configured for expedited and efficient data retrieval by an associated application configured to a display a predetermined number (n)/batch of data records in chronological order, in accordance with embodiments of the present invention. In addition to providing more details for the database 400, FIG. 2 provides various optional embodiments of the database 400. The database 400 may comprise one or more computing devices, such as server(s), storage device(s) and other computing device that is capable of implementing a database. The database 100 includes a memory 402, and one or more processors 404 in communication with the memory. The memory 404 may comprise volatile and non-volatile memory, such as read-only and/or random-access memory (RAM and ROM), or any memory common to computer platforms.

The processor(s) 404 may be application-specific integrated circuits ("ASICs"), or other chipsets, logic circuits, or other data processing device(s). Processor 404 may execute an application programming interface ("API") (not shown in FIG. 2) that interfaces with any resident programs (i.e., sequence trigger 410, sequencer 420, cache table re-populator 450 or the like) stored in the memory 402 of the database 400. Processor 404 may include various processing subsystems (not shown in FIG. 2) embodied in hardware, firmware, software, and combinations thereof, that enable the functionality of the database 400 and the operability of the database 400 on a distributed computing network (200 shown in FIG. 1) that allows for the database 400 to communicate with the application 300 (shown in FIG. 1). For example, processing subsystems allow for initiating and maintaining communications and exchanging data with other networked devices. For the disclosed aspects, processing subsystems of processor 404 may include any subsystem used in conjunction with the related codes, routines, subroutines, algorithms, sub-algorithms, modules, and sub-modules thereof.

The database 400 additionally includes communication mechanism 406 embodied in hardware, firmware, software, and combinations thereof, that enables electronic communications between the database 400 and other platforms, apparatus and/or devices, such as apparatus 500 (shown in FIG. 3) executing application 300. Thus, communication mechanism 406 may include the requisite hardware, firmware, software and/or combinations thereof for establishing and maintaining a network communication connection.

The memory 402 of database 400 stores sequence trigger 410 which is configured to trigger the sequencer 420 to generate a sequence identifier 422 in response to an event. In embodiments of the present invention the event is receipt of the data transmission 310 by the database 400.

Additionally, memory 402 of database 400 stores sequencer 420, which may comprise one or more sequencing schemas/algorithms for generating a unique numeric sequence identifier 422 for each data record 312 received into the database 400. As previously discussed the sequencer 410 is triggered, by the sequence trigger 410, to generate the sequence identifier 422 in response to database receipt of the data transmission 310. In specific embodiments of the invention the sequencer 420 is configured to create sequence identifiers in sequential order based on a predetermined sequence pattern. In specific embodiments of the invention, the sequence pattern is an increment of one (1) and, thus, the initial sequence identifier is one (1) and each subsequent sequence identifier is incremented by a value of one (1) (i.e., 2, 3, 4 and so on). However, in other embodiments of the invention the predefined sequence pattern may be any other pattern that indicates a sequence.

In addition, the memory 402 of database 400 stores a cache table 432 that is configured to create an cache entry 432 in response to the sequencer 420 generating a sequence identifier 422. The cache entry 432 that is created associated the sequence identifier 422 with the session identifier 316 of the data record 312. In specific embodiments of the invention, the cache entry 432 is created simultaneous with the persistence of the data record 312 into one or more data tables 440 of the database 400. The cache table 432 is configured to provide for the application 300 (shown in FIG. 1) to readily identify a predetermined number (n) sequentially ordered cache entries 432 and expedite the retrieval of data records 312 from the data tables 440 based on the session identifiers 316 in the cache entries 432.

Referring to FIG. 3 a block diagram is presented of an apparatus 500 configured for executing an application 300 configured for expedited and efficient data retrieval from an associated database, in accordance with embodiments of the present invention. In addition to providing more details for the application 300, FIG. 3 provides various optional embodiments of the application 300. The apparatus 500 may comprise one or more computing devices, such as personal computer, laptop/mobile computing devices, servers, and other computing device that is capable of executing application 300. The apparatus 500 includes a memory 502, and one or more processors 504 in communication with the memory. The memory 504 may comprise volatile and non-volatile memory, such as read-only and/or random-access memory (RAM and ROM), or any memory common to computer platforms.

The processor(s) 504 may be application-specific integrated circuits ("ASICs"), or other chipsets, logic circuits, or other data processing device(s). Processor 504 may execute an application programming interface ("API") (not shown in FIG. 3) that interfaces with any resident programs (i.e., data retrieval logic 320, cache table re-populator or the like) stored in the memory 504 of the apparatus 500. Processor 504 may include various processing subsystems (not shown in FIG. 2) embodied in hardware, firmware, software, and combinations thereof, that enable the functionality of the apparatus 500 and the operability of the apparatus 500 on a distributed computing network (200 shown in FIG. 1) that allows for the apparatus 500 to communicate with the database 400 (shown in FIG. 1). For example, processing subsystems allow for initiating and maintaining communications and exchanging data with other networked devices. For the disclosed aspects, processing subsystems of processor 504 may include any subsystem used in conjunction application 300 and the related codes, routines, sub-routines, algorithms, sub-algorithms, modules, and sub-modules thereof.

The apparatus 500 additionally includes communication mechanism 506 embodied in hardware, firmware, software, and combinations thereof, that enables electronic communications between the apparatus 500 and other platforms, apparatus and/or devices, such as database 400 (shown in FIG. 2). Thus, communication mechanism 506 may include the requisite hardware, firmware, software and/or combinations thereof for establishing and maintaining a network communication connection.

The memory 502 of apparatus 500 stores application 300, As previously discussed the application 300 is configured to receive user inputs of data 314 during a user session and, subsequently, transmit a data transmission 310 (i.e., data file) to the associated database 400, which may in certain embodiments be an embedded database. The data transmission 400 includes a data record 312 comprising the data 314, and a session identifier 316, which is a unique numeric or alphanumeric identifier generated by the application for the user session.

Application 300 is further configured to display data records 312 from previous user sessions. In specific embodiments of the invention, the application 300 is configured to retrieve and display a predetermined number (i.e., a "batch") of data records 312 at one time, such through the use of a single user interface (i.e., an application page 360). In addition, according to embodiments of the invention herein disclosed, the application may be configured such that the data records 312 are displayed in chronological order. For example, the application 300 may be configured to display the data records 312, in sequential order, the most recent data records 312 (i.e., the most recent data record 312 is displayed first, followed by the second-most recent data record 312 and so on), or the application 300 may be configured to display, in sequential order, the oldest data record 312 (i.e., the oldest data record 312 is displayed first, followed by the second oldest data record 312 and so on).

The application includes data retrieval logic 320 that is configured to retrieve data records 312 from the database 400 and display the retrieved data records 312, in batch-like form, within an application page 360, in accordance with an embodiment of the invention. The data retrieval logic 320 includes sequence identifier determiner 330 that is configured to, in response to receiving an initial call for retrieval and display of a predetermined number (n) 372 of data records 312 (i.e., the initial "batch" of data records 312), query the sequencer 420 (shown in FIG. 2) within the database 400 to determine the last-in-time sequence identifier (x) 332 (i.e., the most recently generated sequence identifier).

In specific embodiments of the invention, the initial call may be automatically made in response to the user launching the application or the user logging into the application. It should be noted that subsequent calls (i.e., requesting a succeeding page in the application or a previously viewed page) for retrieval and display of a predetermined number ($n_1$) of data records 312 (i.e., a subsequent "batch" of data records 312), may not require querying the sequencer 420 for determination of the last-in-time sequence identifier (x) 332, since the application will be configured to hold the determined last-in-time sequence identifier 332 in memory. It should also be noted that the predetermined number ($n_1$) of data records retrieved as a result of a subsequent call may be the same number as the predetermined number (n) 372 retrieved as a result of the initial call or the predetermined number ($n_1$) may be a different number than the predetermined number (n) 372. For example, the application may be configured such that the home/landing page displays a certain number of data records 312, while succeeding pages 360 display more or less data records 312 than the home/landing page. While in other embodiments of the invention, the application 300 may display the same number of data records on all pages 360 of the application 300

In specific embodiments of the invention, the last-in-time sequence identifier 332 is determined by querying the sequencer 420 for a yet-to-be-assigned next sequence identifier (y) and subtracting from the yet-to-be-assigned next sequence identifier (y) a sequence value. For example, in those embodiments of the invention in which the sequence value is one (1), the last-in-time sequence identifier (x) 332 is equal to the yet-to-be-assigned next sequence identifier (y)−1.

The data retrieval logic 320 additionally includes cache entry range determiner 370 that is configured to determine the sequence identifier range 374 of the entries 432 within the cache table 430 (shown in FIG. 2) that require session identifier 316 retrieval from the cache table 430 based on the last-in-time sequence identifier (x) 332 and the predetermined number (n) 372 of data records 312 required to retrieved. Specifically, the sequence identifier range 374 of cache entries 432 is defined as (x-n). The data retrieval logic 320 additionally includes session identifier retriever 340 that is configured to retrieve the session identifiers 316 of the cache entries 432 that are within the determined sequence identifier range 374.

Additionally, data retrieval logic 320 includes data record retriever 350 that is configured to, in response to retrieving the session identifiers 316 of the cache entries 432 that are within the determined sequence identifier range 374, access the data tables 430 within the data base 400 to retrieve the data records 312 associated with the session identifiers 316. In response to retrieving the data records, the application 300 is configured to populate the application 360 with the data records 312.

In additional embodiments of the invention the application 300 stores cache table re-populator 450 that is configured to, in response to a predetermined event (e.g., database crash or the like) that clears/erases the data in the cache table, automatically re-populate the cache table 450. The cache table re-populator 450 is configured to reset the sequencer 420 to an initial sequence value (e.g., in those embodiments of the invention in which the sequence pattern is an increment of one (1), resetting the sequencer to a sequence value of one (1)). Further, the cache table re-populator 450 is configured to query the data tables 440 to determine the session identifiers 316 and timestamps 452 of data records 312 that comprise the database 400, and invoke the sequencer 420 to generate in sequential order, based on the timestamps 452 of the data records 312, sequence identifiers 422 for each data record and create entries 432 in the cache table 430 that associate the newly generated sequence identifiers 422 with the session identifiers 316. As such, the present invention has the ability to automatically re-generate and re-populate the cache table 430 in the event the database "crashes" or some other event occurs that requires re-population of the cache table 430.

Referring to FIG. 4 a schematic/flow diagram is presented of a method 600 for persisting data in a database while simultaneously creating a sequenced entry for the data in a cache table, in accordance with embodiments of the invention. The application 300 transmits a data transmission 310 to the database 440, such as an embedded database, that comprises (i) data records including data, and (ii) a session identifier 316, which is a numeric or alphanumeric identifier tied to the user session during which the data is captured. The receipt of the data transmission 310 by the database 400 triggers the sequence trigger 410 to send a signal to the sequencer 420 to generate a sequence identifier 420. The sequence identifier 420 generates the next sequence identifier in the sequence pattern. For example, in those embodiments of the invention, in which the sequence pattern is an increment of one (1), the next sequence identifier will increment the last-in-time previously assigned sequence identifier by one (1). While the data from the data record is being persisted into the data tables 440 of the database 400, a cache entry 432 is created in the cache table 430 that associates the sequence identifier 422 with the session identifier 316.

In one specific embodiment of the invention, in which an ORACLE® database is implemented, the cache table and cache entries are created based on the following commands:

- CREATE TABLE SCHEMA_OWNER.AICACHE (sequenceid number not null, dataid varchar(...), dataid2 number...);
- CREATE SEQUENCE SCHEMA_OWNER.AICACHE_SEQ minvalue 1 start with 1 increment by 1;
- create or replace trigger AICACHE_TRIGGER1 before insert on AICACHE -continued Referencing NEW AS NEW
OLD as OLD
for each row
begin
:new.itemid := AICACHE_SEQ.NEXTVAL;
end;
/

Referring to FIG. 5 a schematic/flow diagram is presented of a method 700 for retrieving a predetermined number of data records from a database, such as an embedded database, for chronological display in an associated application, in accordance with embodiments of the invention. The application receives a call for retrieval of a predetermined number of data records and, in response, (1) calls the sequencer 420 within the database 400 to retrieve the yet-to-assigned next sequence identifier (e.g., AICACHE_SEQ). In response to retrieving the yet-to-assigned next sequence identifier, the application determines the last-in-time sequence identifier by subtracting from the yet-to-assigned next sequence identifier a sequence value (yet-to-assigned next sequence identifier−sequence value=last-in-time sequence identifier). For example, in those embodiments of the invention in which the sequence pattern is an increment of one (1), the sequence value is one (1) and, thus the last-in-time sequence identifier is the yet-to-be assigned next sequence identifier−1.

In response to determining the last-in-time sequence identifier, (2) the application 300 retrieves a predetermined number (n) of session identifiers corresponding to the cache entries having sequence identifiers within the range of (last-in-time sequence identifier−(n)). The predetermined number (n) of data records corresponds to the number of data records (i.e., the batch) that are configured to be displayed within a page of the application. In response to retrieving the session identifiers, (3) the application retrieves the predetermined number (n) of data records from the data tables 440 based on the session identifiers retrieved from the cache entries. In response to retrieving the data records the data is displayed in the user interface/application page.

Referring to FIG. 6 a schematic/flow diagram is presented of a method 900 for re-populating a cache table within a database, in accordance with embodiments of the invention. In response to the application detecting the occurrence of a predetermined event (e.g., database crashes and/or cache table crashes or the like), (1) the application 300 sends a signal to the sequencer 420 to reset the sequence value to an initial sequence value. In those embodiments of the invention in which the sequence pattern is an incremental increase on one (1), the sequence is reset so that the yet-to-be assigned next-in-time sequence identifier is one (1). In specific embodiments of the invention, in which an ORACLE® database is implemented, sequence may be reset to one (1) based on the following commands:

ALTER sequence SCHEMA_OWNER.AICACHE_SEQ increment by 1−(last sequence value−(last sequence value−1))

In response to resetting the sequence value or while the sequence value is being reset, (2) the application 300 retrieves the session identifiers and timestamps of all data records in the data tables 440 of the database 400. The timestamps allow for the application to determine the sequential order in which the data records 312 were received in the database 400. In response to retrieving the session identifiers and the sequential order, (3) the application calls the sequencer 420 to create sequence IDs for the data records in the sequential order and (4) re-populates the cache table 430 with new cache entries 432 that associate the newly generated sequence identifiers 422 with the session identifiers 316 retrieved from the data tables 312.

Referring to FIG. 7 a flow diagram is present of a method 900 for efficient data retrieval from a database, in accordance with embodiments of the present invention. At Event 910, in response to an application receiving inputs of data during a user session, a data transmission is transmitted to a database that includes (i) a data record including the inputted data and (ii) a session identifier (i.e., a numeric or alphanumeric identifier tied to the user session in which the data was inputted).

In response to the database receiving the data transmission which serves as a trigger for the sequencer, at Event 920, a next sequence identifier is generated for the data record and, at Event 930, an entry is created in a cache table that associated the next sequence identifier with the session identifier of the data record. While the cache entry is being created, at Event 940, the data from the data record is persisted into one or more of the data tables of the database.

In response to the application receiving an initial call for display of a predetermined number (n) of data records (e.g., a batch of data records to be displayed on home/landing page of an application), at Event 950, the application queries the sequencer to determine the sequence identifier (x) of a last-in-time cache entry and the range of sequence identifiers for cache entries corresponding to (x-n). In specific embodiments of the invention, determining the sequence number (x) of the last-in-time cache entry provides for querying the sequencer to identify a yet-to-be-assigned next sequence identifier (y) and subtracting, from the yet-to-be-assigned next sequence identifier (y), a sequence value. For example, in those embodiments of the invention in which the sequence value is one (1) the sequence number (x) is the yet-to-be-assigned next sequence identifier (y)−1 (i.e., x=y−1). In further specific embodiments of the invention, determining the range of sequence identifiers for the cache entries beginning with the sequence identifier (x) and ending with a sequence identifier (z) defined as (x-n).

At Event 960, the application requests retrieval from the data tables of the predetermined number (n) of data records based on the session identifiers of the cache entries (x-n). In specific embodiments of the invention, the session identifiers are retrieved from the cache table based on the determined range of sequence identifiers for the cache entries (x-n). At Event 970, the application receives the predetermined number (n) of data records and, at Event 980, populates the user interface/application page with the data records in chronological order/sequence (e.g., most recent data record first).

In other embodiments of the method (not shown by the Events in FIG. 7), in response to the application receiving a further call to retrieve an additional predetermined number ($n_1$) of data records, a request is made to the database to retrieve, from the data tables, the additional predetermined number ($n_1$) of data records based on the sequence identifier (z) (i.e., x-n) and, the application receives, from the data tables, the additional predetermined number ($n_1$) of data records and populates within another page of the application the data from the data records. The additional predetermined number ($n_1$) may be associated with the next batch of data records in the sequence (i.e., an application page yet to be presented to the user) or a previously retrieved/displayed batch of data records (i.e., an application page already presented to the user). In such embodiments of the invention, there is no need to determine the sequence number (x) of the last-in-time cache entry since the application already stores such in memory.

Additionally, the application may be configured to, upon detection of an event that requires re-population of the cache table, the sequencer is reset to an initial sequence value (e.g., one (1)) and the database is queried to determine session identifiers of data records and a corresponding timestamp associated with receipt a data record into the database. The predetermined event may be a database and/or cache table crash or the like. The cache table is subsequently re-populated with new entries corresponding to each of the data records and comprising the session identifiers located in the data tables and the newly generated sequence identifiers.

Thus, systems, apparatus, methods, and computer program products described above provide for expediting the retrieval of data from a database and loading of the retrieved data in an associated application. Specifically, the invention is applicable to expediting retrieving data in chronological order, such as Last-In First-Out (LIFO) or the like. In this regard, the invention implements a cache table within the database that associates a session identifier (i.e., a data record identifier) with a sequence identifier. In this regard, as data records are received into the database, a sequencer is triggered to generate a sequence identifier for the data record and an entry is created in the cache table that associates the sequence identifier with the session identifier. Data is retrieved from the database and populated within the application, by (i) accessing the sequencer within the database to determine the last-in-time sequence identifier, (ii) accessing the cache table to determine a range of entries beginning with the last-in-time sequence identifier and ending with the (last-in-time sequence identifier-predetermined number of data records), and (iii) retrieving the data records in the applicable data tables based on the associated session identifiers in the cache table entries.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing data retrieval, the system comprising:
    an application stored in a first memory, executable by one or more first processors and configured to receive inputs of data during a user session, and transmit, to the database, a data transmission including (i) a data record including the data, and (ii) a session identifier; and
    the database stored in a second memory, executable by at least one second processors, and including:
        a sequencer configured to be triggered by receipt of the data transmission and generate a next sequence identifier for the data record,
        a cache table configured to receive the next sequence identifier and create an entry in the cache table that associates the next sequence identifier with the session identifier for the data record, and one or more data tables configured to persist data from the data record, wherein the application is further configured to:

receive a predetermined number (n) of data records from the database by:

in response to receiving an initial call to display the predetermined number (n) of data records, querying the sequencer to determine a sequence identifier (x) of a last-in-time entry in the cache table, retrieving the predetermined number (n) of cache entries from the cache table based on the sequence identifier (x) of the last-in-time entry and identify the session identifiers for each of the predetermined number of cache entries, requesting the database to retrieve, from the data tables, the predetermined number (n) of data records based on the identified session identifiers, and receiving from the database and populating within a page of the application the predetermined number (n) of data records, and in response to detecting a failure of the database that requires re-population of the cache table, (i) query the database to determine session identifiers of data records and a corresponding timestamps associated with receipt of a data record into the database, and (ii) re-populate the cache table with entries corresponding to each of the data records based on the session identifiers and the corresponding timestamps.

2. The system of claim 1, wherein the application is further configured to query the sequencer to determine the sequence identifier (x) by querying the sequencer to determine a yet-to-be-assigned next sequence identifier (y) and subtracting, from the yet-to-be-assigned next sequence identifier (y), a sequence value.

3. The system of claim 1 wherein the application is further configured to request the database to retrieve, from the data tables, the predetermined number (n) of data records by:

determining a range of sequence identifiers defining the predetermined number (n) of data records based on the sequence identifier (x), requesting the cache table to retrieve session identifiers associated with the range of sequence identifiers, and requesting the database to retrieve, from the data tables, the predetermined number (n) of data records corresponding to the retrieved session identifiers.

4. The system of claim 3, wherein the application is further configured to determine the range of sequence identifiers, wherein the range begins with the sequence identifier (x) and ends with a sequence identifier (z) defined as (x-n).

5. The system of claim 4, wherein the application is further configured receive an additional predetermined number ($n_1$) of data records from the database by:

in response to receiving a subsequent call to display the additional predetermined number ($n_1$) of data records, requesting the database to retrieve, from the data tables, the additional predetermined number ($n_1$) of data records based on the sequence identifier (z), and receiving from the database and populating within another page of the application the additional predetermined number ($n_1$) of data records.

6. The system of claim 5, wherein the application is further configured to request the database to retrieve, from the data tables, the additional predetermined number ($n_1$) of data records by:

determining a second range of sequence identifiers defining the additional predetermined number ($n_1$) of data records based on the sequence identifier (z), requesting the cache table to retrieve session identifiers associated with the second range of sequence identifiers, and requesting the database to retrieve, from the data tables, the additional predetermined number ($n_1$) of data records corresponding to the retrieved session identifiers.

7. The system of claim 1, wherein application is configured to re-populate the cache table with entries corresponding to each of the data records by assigning the data record with an earliest timestamp a first sequence identifier.

8. A computer-implemented method for managing data retrieval, the method executed by a computing device processor and comprising:

in response to receiving, at an application, inputs of data during a user session, transmitting, to a database, a data transmission including a (i) a data record including the data, and (ii) a session identifier associated with the user session;

in response to receiving, at the database, the data transmission, triggering generation of a next sequence identifier for the data record;

creating an entry within a cache table that associates the next sequence identifier with the session identifier for the data record;

persisting the data from the data record in one or more data tables within the database;

receiving a predetermined number (n) of data records from the database by:

in response to receiving an initial call to display within the application the predetermined number (n) of data records, querying the sequencer to determine a sequence identifier (x) of a last-in-time entry in the cache table;

retrieving the predetermined number (n) of cache entries from the cache table based on the sequence identifier (x) of the last-in-time entry and identifying the session identifiers for each of the predetermined number of cache entries;

requesting the database to retrieve, from the data tables, the predetermined number (n) of data records based on the identified session identifiers; and receiving from the database and populating within a page of the application the predetermined number (n) of data records; and in response to detecting, at the application, a failure of the database that requires re-population of the cache table, (i) querying the database to determine session identifiers of data records and corresponding timestamps associated with receipt of a data record into the database, and (ii) re-populating the cache table with entries corresponding to each of the data records based on the session identifiers and the corresponding timestamps.

9. The method of claim 8, wherein querying the database to determine the sequence identifier (x) further comprises:

querying the database to determine a yet-to-be-assigned next sequence identifier (y); and calculating the sequence identifier (x) by subtracting a sequence value from the yet-to assigned next sequence identifier (y).

10. The method of claim 8, wherein requesting retrieval of the predetermined number (n) of data records further comprises:

determining a range of sequence identifiers defining the predetermined number (n) of data records based on the sequence identifier (x);

retrieving from the cache table session identifiers associated with the range of sequence identifiers, and retrieving, from the data tables, the predetermined number (n) of data records corresponding to the retrieved session identifiers.

11. The method of claim 10, wherein determining the range of sequence identifiers further comprises determining the range of sequence identifiers, wherein the range begins with the sequence identifier (x) and ends with a sequence identifier (z) defined as (x-n).

12. The method of claim 11, further comprising:

in response to the application receiving a subsequent call to display additional predetermined number ($n_1$) of data records, requesting retrieval, from the data tables, of the additional predetermined number ($n_1$) of data records based on the sequence identifier (z), and receiving from the database and populating within another page of the application the additional predetermined number ($n_1$) of data records.

13. The method of claim 12, wherein requesting retrieval of the additional predetermined number ($n_1$) of data records further comprises:

determining a second range of sequence identifiers defining the additional predetermined number ($n_1$) of data records based on the sequence identifier (z), requesting the cache table to retrieve session identifiers associated with the second range of sequence identifiers, and requesting retrieval, from the data tables, of the additional predetermined number ($n_1$) of data records corresponding to the retrieved session identifiers.

14. A computer program product including a non-transitory computer-readable medium, the computer-readable medium comprising:

a first set of codes for causing a computer to, in response to receiving, at an application, inputs of data during a user session, transmit, to a database, a data transmission including (i) a data record including the data, and (ii) a session identifier associated with the user session;

a second set of codes for causing a computer to, in response to receiving, at the database, the data transmission, triggering generation of a next sequence identifier for the data record;

a third set of codes for causing a computer to create an entry within a cache table that associates the next sequence identifier with the session identifier for the data record;

a fourth set of codes for causing a computer to persist the data from the data record in one or more data tables within the database;

a fifth set of codes for causing a computer to receiving a predetermined number (n) of data records from the database by (i) in response to receiving an initial call to display within the application the predetermined number (n) of data records, query the sequencer to determine a sequence identifier (x) of a last-in-time entry in the cache table, (ii) retrieve the predetermined number (n) of cache entries from the cache table based on the sequence identifier (x) of the last-in-time entry and identify the session identifiers for each of the predetermined number of cache entries, (iii) request the database to retrieve, from the data tables, the predetermined number (n) of data records based on the identified session identifiers, and (iv) receive from the database and populate within a page of the application the predetermined number (n) of data records; and a fifth set of codes for causing a computer to, in response to detecting, at the application, a failure of the database that requires re-population of the cache table, (i) query the database to determine session identifiers of data records and corresponding timestamps associated with receipt of a data record into the database, and (ii) re-populate the cache table with entries corresponding to each of the data records based on the session identifiers and the corresponding timestamps.

* * * * *